US012710200B2

(12) United States Patent
Adio

(10) Patent No.: US 12,710,200 B2
(45) Date of Patent: Aug. 18, 2026

(54) SOLAR ASSISTED ELECTRICITY GENERATING UNIT

(71) Applicant: ADIO INNOVATIVE LIMITED, Point Fortin (TT)

(72) Inventor: Ambokile Adio, Point Fortin (TT)

(73) Assignee: ADIO INNOVATIVE LIMITED, Point Fortin (TT)

( * ) Notice: Subject to any disclaimer, the term of this patent is extended or adjusted under 35 U.S.C. 154(b) by 0 days.

(21) Appl. No.: 19/277,500

(22) Filed: Jul. 23, 2025

(65) Prior Publication Data

US 2026/0029163 A1 Jan. 29, 2026

Related U.S. Application Data

(60) Provisional application No. 63/674,356, filed on Jul. 23, 2024.

(51) Int. Cl.

*F24S 10/40* (2018.01)
*F24S 23/77* (2018.01)
*F24S 30/40* (2018.01)
*F24S 60/30* (2018.01)
*F24S 80/52* (2018.01)
*F24S 23/70* (2018.01)
*F24S 80/50* (2018.01)

(52) U.S. Cl.

CPC ............... *F24S 10/40* (2018.05); *F24S 23/77* (2018.05); *F24S 30/40* (2018.05); *F24S 60/30* (2018.05); *F24S 80/52* (2018.05); *F24S 2023/84* (2018.05); *F24S 2080/503* (2018.05)

(58) Field of Classification Search

CPC .. F24S 10/40; F24S 20/20; F24S 23/77; F24S 23/70; F24S 23/71; F24S 23/72; F24S 23/745; F24S 23/75; F24S 23/79; F24S 23/80; F24S 23/81; F24S 23/82; F24S 30/40; F24S 60/30; F24S 80/52; F24S 2023/84; F24S 2023/503; Y02E 10/40; Y02E 10/44; Y02E 10/50

See application file for complete search history.

(56) References Cited

U.S. PATENT DOCUMENTS 3,995,429 A * 12/1976 Peters ..................... F01K 25/08 60/671
9,278,315 B2 * 3/2016 Davis ................... B01D 1/0035
10,066,856 B2 * 9/2018 Ibrahim ................ F25B 27/007
11,235,985 B2 * 2/2022 Cen ......................... H02S 40/44
12,305,622 B2 * 5/2025 Ding ....................... F03G 6/074
12,429,036 B2 * 9/2025 Singh ...................... F01D 15/10
2020/0271036 A1 * 8/2020 Warren ..................... F01N 1/02
2024/0084972 A1 * 3/2024 Xie .......................... F17C 5/02
2024/0229681 A1 * 7/2024 O'Donnell ................ F01K 3/02

* cited by examiner

*Primary Examiner* — Dapinder Singh
(74) *Attorney, Agent, or Firm* — Nixon & Vanderhye PC

(57) ABSTRACT

The technology described herein relates to, among other topics, a power system using solar assisted equipment that significantly reduces the amount of fossil fuels burned in the energy production process. The technology described in this disclosure relates to providing a constant flow of thermal heated water to a boiler (e.g., heated using a fossil fuel), which in turn provides steam to operate an electricity generator. The thermal heated water raises the temperature of the water used for creating steam thus reducing the overall boil time (and consequently reducing the amount of time fossil fuels are being consumed).

20 Claims, 3 Drawing Sheets

SOLAR ASSISTED ELECTRICITY GENERATING UNIT

CROSS REFERENCE TO RELATED APPLICATION(S)

This application claims priority to U.S. Patent Application No. 63/674,356, filed Jul. 23, 2024, the entire contents of which are incorporated herein by reference.

BACKGROUND

Throughout the world, power plants work to generate vast amounts of electricity to power a population. In various conventional approaches, a heat source is used to heat a tank of water and, upon heating, steam emanates from the tank. The steam can then rise into the air and begin moving a mechanical system (e.g., turbines) that essentially generate electrical energy.

While the conventional approach is useful for generating electrical energy, the conventional approach also has certain drawbacks. For example (and as a first drawback), the conventional approach can require consuming significant amounts of fossil fuels thus increasing carbon dioxide emissions. As a second drawback, the conventional approach relies on thermal heaters converting the water into steam which uses significant amounts of land and resources of mirrors and lines that are very expensive to construct and maintain.

Accordingly, it will be appreciated that new and improved techniques, systems, and processes are continually sought after.

BRIEF DESCRIPTION OF THE DRAWINGS

The foregoing and other objects, features and/or advantages will be apparent from the following description of particular embodiments, as illustrated in the accompanying drawings in which like reference characters refer to the same parts throughout the different views. The drawings are not necessarily to scale, emphasis instead being placed upon illustrating the principles of various example embodiments. Each embodiment herein may be used in combination with any other embodiment(s) described herein.

DETAILED DESCRIPTION OF EXAMPLE EMBODIMENTS

Overview

The technology described herein relates to, among other topics, a power system using solar assisted equipment that significantly reduces the amount of fossil fuels burned in the energy production process. The technology described in this disclosure relates to providing a constant flow of thermal heated water to a boiler fired by a fossil fuel, which in turn provides steam to operate an electricity generator. The thermal heated water raises the temperature of the water used for creating steam thus reducing the overall boil time (and consequently reducing the amount of time fossil fuels are being burned).

The technology advantageously reduces the use of fossil fuels in generating electricity and, as a result, reduces the emissions of carbon dioxide. Therefore, the technology will not only reduce the cost of generating electricity, but will also assist to combat global warming. Beside providing clean energy, the technology is used in conjunction with fossil fuel and will produce strong and abundant flow of electricity (which photovoltaic sources cannot produce).

The technology of this disclosure is applicable to companies and/or industries that generate and/or use significant amounts of electricity (e.g., alumina smelting, bit coin mining). The technology described herein can also be used in the food processing industry and similar industries, where hot water is in constant demand. It should be appreciated that various parts of the world (particularly less economically fortunate areas) can greatly benefit from the use of the described technology.

It should be appreciated that some of the components described in the figures (and throughout any other portion of this document) may be referred to as singular or plural components. However, these descriptions are for illustration purposes and are non-limiting. For example, if a component is referred to as a system, it should be understood that the system could comprise a single component, or could be multiple components (included distributed components). Likewise, if a component is referred to as a plurality, it should be appreciated that the component may also be implemented via a single component as well.

Figure 1:
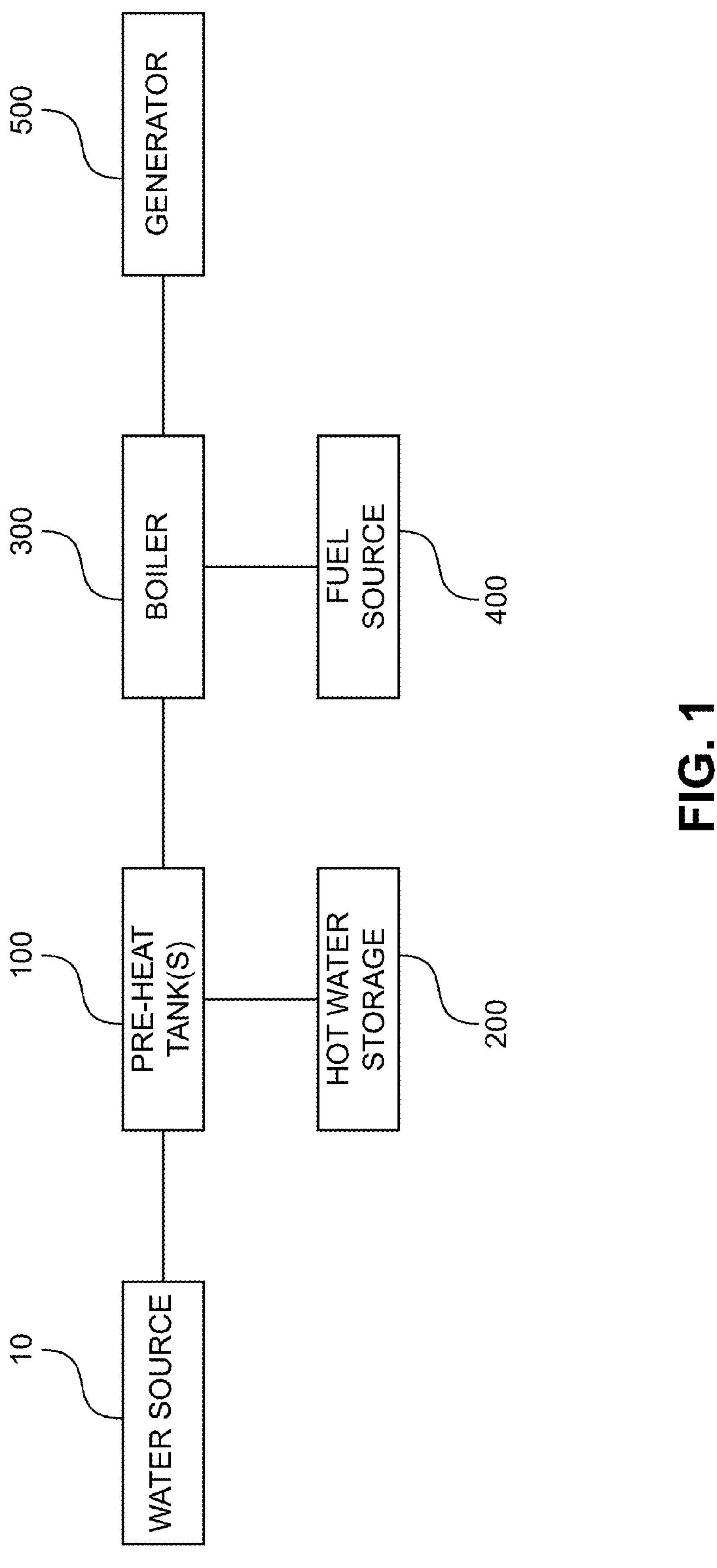
FIG. 1 shows a non-limiting block diagram of an example energy generation system 1.

FIG. 1 shows a non-limiting block diagram of an example energy generation system 1. In one non-limiting example embodiment, energy generation system 1 can include various components for using water to generate electrical energy. System 1 includes a water source 10 configured to provide water to pre-heat tank(s) 100. In one example embodiment, water source 10 may include a water tank/reservoir. Water source 10 could also include a direct water source (e.g., an open public line) for supplying water to tank(s) 100. These examples are of course non-limiting and the technology described herein envisions any variety of components for providing water to system 1.

System 1 includes pre-heat tank(s) 100 that are configured to obtain water from water source 10. In one example embodiment, pre-heat tank(s) 100 will include one or more tanks for holding water while the water is being heated. As explained in further detail herein, pre-heat tank(s) 100 can include an enclosure having a combination of transparent (or translucent) material and heat reflective material for accepting sunlight, and generating and trapping heat. The heat trapped by the enclosure can thus heat water residing in pre-heat tank(s) 100.

Pre-heat tank(s) 100 can be used to supply hot water (e.g., pre-heated water) to boiler 300. In one example embodiment, pre-heat tank(s) 100 can also supply hot water to one or more hot water storage 200. It should be appreciated that hot water storage 200 can include one or more tanks (or reservoirs) for holding hot water supplied from pre-heat tank(s) 100 (e.g., for nighttime storage). Boiler 300 can also obtain hot water from hot water storage 200 in addition to obtaining hot water from pre-heat tank(s) 100.

Boiler 300 may include one or more boiler devices (e.g., tanks) used for boiling water to generate steam. In one example embodiment, boiler 300 may use fuel source 400 to generate heat (e.g., through combustion) where the generated heat can boil the water in the tanks of boiler 300. It should be appreciated that, in one example embodiment, fuel source 400 could include some form of fossil fuel (e.g., gas, coal) where the fuel combusts to generate heat under the tanks of boiler 300.

In doing so, boiler 300 will generate steam that can be used by generator 500 to generate electrical energy. In one example embodiment, generator 500 will include a mechanical device (e.g., turbine) to move as the steam is generated, where an alternator can then convert the mechanical energy from the mechanical device into electrical energy. It should be appreciated that these examples are of course non-limiting and the technology described herein envisions any variety of manners for generating electrical energy.

It should be appreciated that conventional electricity generation systems use different fuel sources to heat an associated boiler. The technology described herein uses pre-heat tank(s) 100 to raise the overall initial temperature of the water provided to boiler 300. In doing so, the boiling time significantly decreases and thus the overall amount of fuel used from fuel source 400 also decreases. The system 1 thus advantageously reduces costs associated with using fuel from fuel source 400, and also significantly reduces the overall carbon footprint of the system.

Figure 2:
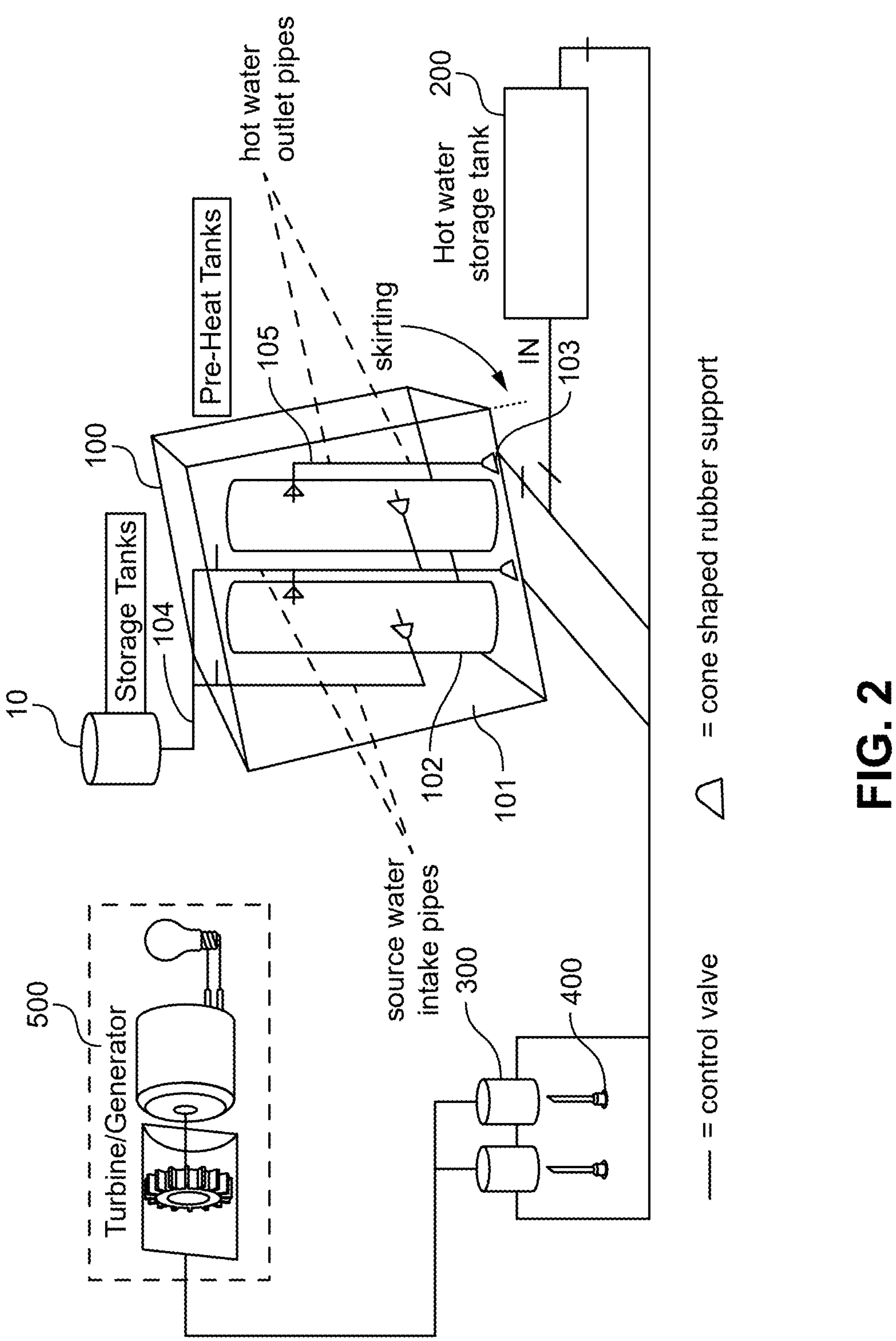
FIG. 2 shows a non-limiting example diagram of system 1 where various components are further illustrated.

FIG. 2 shows a non-limiting example diagram of system 1 where various components are further illustrated. As can be seen in FIG. 2, system 1 includes the water source 10, pre-heat tank(s) 100, hot water storage 200, boiler 300, fuel source 400, and generator 500. As can also be seen in FIG. 2, different pipes are depicted for providing water to tank(s) 100 and for obtaining water from tank(s) 100.

For example, at least two input pipes 104 are shown that provide water to tank(s) 100 while two output pipes 105 provide water output from tank(s) 100. In the example shown in FIG. 2, the pipes 105 used for the output water can be used to provide water to hot water storage 200 and/or boiler 300. These examples are of course non-limiting and the technology described herein envisions any manner in which one or more pipes may be configured.

Pre-heat tank(s) 100 also includes one or more water storage tank(s) 102. As a non-limiting example, at least two pre-heat tank(s) 100 may be used where one tank supplies boiler 300 with water, while the other tank heats the water it is holding (e.g., through a repeatedly occurring process). This example is of course non-limiting and the technology described herein envisions any variety of combination of pre-heat tank(s) 100.

It should be appreciated that water supplied from source 10 (e.g., using pipes 104) is used to occupy water storage tank(s) 102 while the water in the tank(s) 102 begins the heating process. In the example shown in FIG. 2, pipes 104 provide water at or near a lower portion of tank(s) 102 while pipes 105 are positioned at or near a higher portion of tank(s) 102. The positioning of pipes 104 and pipes 105 in this manner can be due to physical nature of heat rising in the tank such that the hottest water may exit from a position at or near the top of the tank.

Pre-heat tank(s) 100 may include an encasing 101 that is used to aid in the heating process. In one example embodiment, encasing 101 can include one or more wall portions that are made of a heat generating material, where one or more other wall portions include a transparent material (e.g., glass). The wall portions made of the transparent material may allow light (e.g., sunlight) into the encasing 101, where the wall portions made of the heat generating material may reflect the light to generate heat which can be trapped by encasing 101. For example, four wall portions may be made of transparent material to allow sunlight to enter into encasing 101 where two wall portions may be made of reflective material to reflect light inside encasing 101 thereby trapping heat within encasing 101.

Pre-heat tank(s) 100 may further include cone(s) 103 that can be used to support and position encasing 101. In one example embodiment, cone(s) 103 may allow encasing 101 to be positioned at an angle (e.g., 45 degrees) in order to maximize the ability to receive sunlight while generating heat. It should be appreciated that cone(s) 103 may be configured to help encasing 101 move with the sunlight as the day progresses and allow encasing 101 to act as a solar tracker.

As a non-limiting example, cone(s) 103 may include one or more flex cones configured for placement on (or around) pipes 104 and/or pipes 105. That is, cone(s) 103 may be placed on pipes entrance and exit from encasing 101 and/or at bottom of pre-heat tank(s) 100. It should be appreciated that a solar tracker may only move a radiation box (e.g., encasing 101), while heavier tanks along with supply and exit pipes remain stationary. As such, cone(s) 103 may allow a solar tracker to move the radiation box (e.g., encasing 101).

Figure 3:
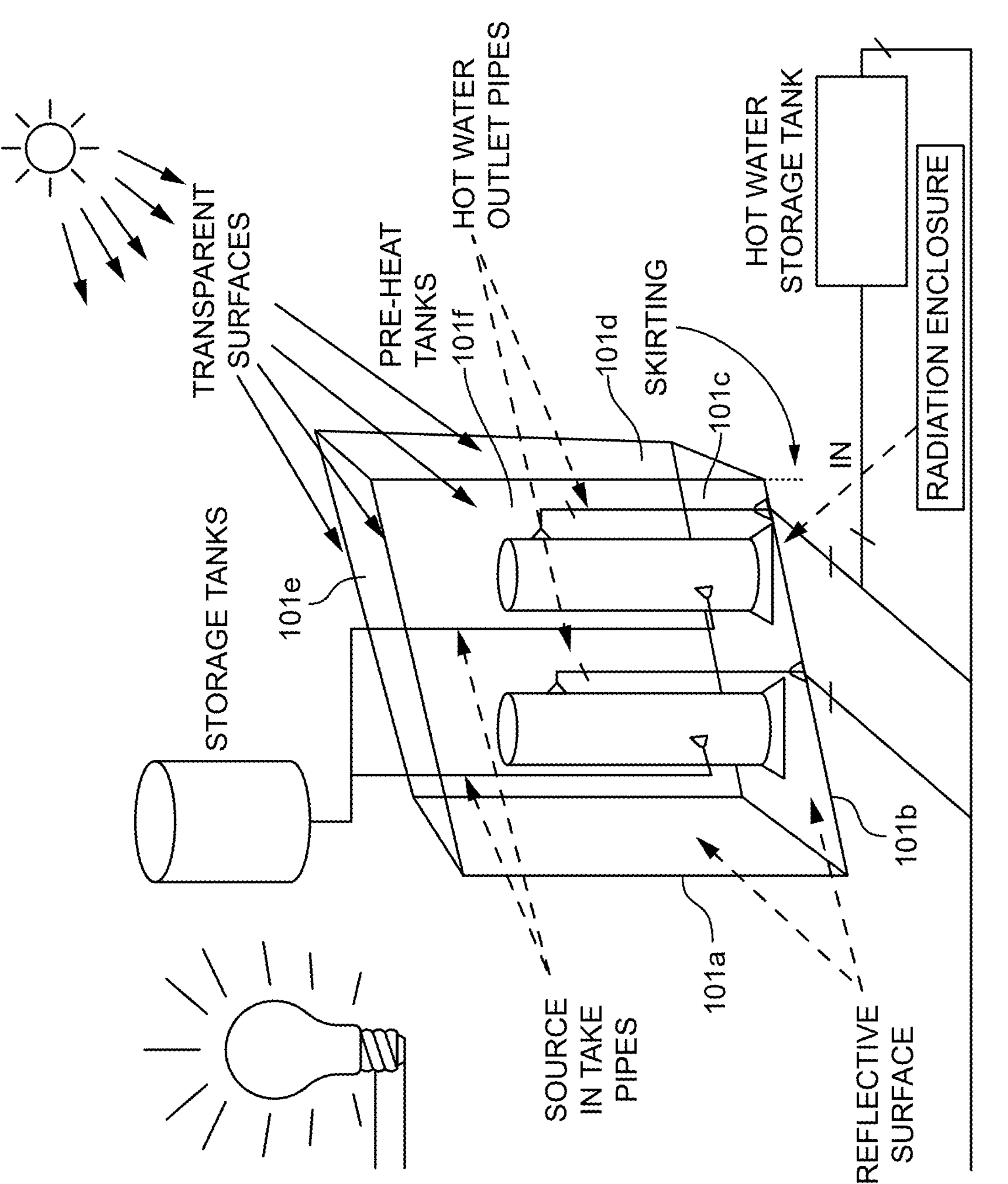
FIG. 3 shows a further non-limiting example where portions of encasing 101 for pre-heat tank(s) 100 are illustrated.

FIG. 3 shows a further non-limiting example where portions of encasing 101 for pre-heat tank(s) 100 are illustrated. In one example embodiment, encasing 101 is formed of a cuboid structure having six sides. This example is of course non-limiting and encasing 101 can be of any particular shape including, but not limited to, a spherical shape, a pyramidal shape, and/or an octagonal shape.

As mentioned herein, encasing 101 can include six sides **101*a*-101*f* where one or more of sides 101*a-f* can be made of varying material. In one example embodiment, side 101*a* and side 101*b* can be made of a reflective material (e.g., having a reflective surface) where sides 101*c*-101*f* may be made of a transparent material. For example, sides 101*a-b*** may be made of a construction material used for building a roof where the material may allow the sunlight directed at the surface of the material to reflect the sunlight and thereby generate heat.

Sides **101*c-f* could be made of a transparent material, such as glass, where sunlight can enter encasing 101. In one example embodiment, sides 101*a* and 101*b* may correspond to a "left" and "bottom" side of encasing 100, while sides 101*c-f* may correspond to a "front" side, a "right" ride, a "back" side, and a "top" side. These examples are of course non-limiting and the sides 101*a-f* of encasing 100 may be configured in any arrangement. Moreover, the example shown in FIG. 3** depicts two sides having the reflective material while the other four sides include the transparent material. But, this example is non-limiting and the technology envisions any variety of arrangement (e.g., three sides having reflective material while the other three sides have transparent material).

It should be appreciated that encasing 101 may be positioned (e.g., using cones 103) in a manner to maximize the amount of light entering encasing 101. For example, encasing 101 may be positioned at a 45 degree angle to maximize the ability to light to enter encasing 101. This example is of course non-limiting and the technology described herein envisions any variety of angle at which encasing 101 may be positioned.

Encasing 101 may also be configured to include one or more sensors that can detect the light from the light source (e.g., the sun) and allow encasing 101 to move with the light as the day progresses. For example, the sensors could detect the amplitude of light hitting the sensors and then trigger a control system that enables encasing 101 to move (e.g., via one or more motors) to "follow" the sunlight. The transparent surfaces of sides 101*c-f* allow the sunlight to enter encasing 101 where the light will "hit" the reflective surfaces of sides 101*a* and 101*b*.

In doing so, sides 101*a* and 101*b* can reflect and generate heat that will be trapped within encasing 101 thereby creating a very hot environment to heat the water situated in one or more tanks 102. By heating tanks 102 in this manner, pre-heat tank(s) 100 can provide heated water to boiler 300 thereby reducing the overall amount of time needed to boil the water (and thus reducing the fuels used from fuel source 400).

Technical Advantages of Described Subject Matter

The technology described herein includes a solar assisted electricity generating unit that uses a form of solar technology to pre-heat water in various tanks. The pre-heated water can be supplied to one or more boilers where the boilers are then further heated to generate steam used by a generator to create electrical energy. The water supplied from the one or more pre-heat tanks allows the boilers to boil the water and generate steam in less time compared to conventional technology thus reducing the overall amount of fuel used. In doing so, the technology advantageously reduce costs associated with a power generation system, while also reducing the overall carbon footprint of the system.

Further Applications of Described Subject Matter

As used in this document, the term "and/or" includes any and all combinations of one or more of the associated listed items.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

Although process steps, algorithms or the like, including without limitation with reference to any of the figures, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed While the technology has been described in connection with what is presently considered to be an illustrative practical and preferred embodiment, it is to be understood that the technology is not to be limited to the disclosed embodiment, but on the contrary, is intended to cover various modifications and equivalent arrangements.

The invention claimed is:

1. A system configured to generate electricity, the system comprising:

a first storage tank configured to hold a liquid;

a pre-heat system;

a second storage tank configured to hold the liquid;

a boiler; and an energy source, wherein the pre-heat system comprises:

one or more pre-heat tanks for heating the liquid;

an encasing at least partially surrounding the one or more pre-heat tanks; and one or more support components configured to support the encasing and cause the encasing to move, wherein one or more input pipes connect the first storage tank to the pre-heat system, one or more output pipes connect the pre-heat system to the second storage tank, the first storage tank provides the liquid to the pre-heat system using the one or more input pipes, and the pre-heat system is configured to heat the liquid and provide the heated liquid to the second storage tank using the one or more output pipes.

2. The system of claim 1, wherein the encasing includes a cuboid structure.

3. The system of claim 2, wherein the cuboid structure includes at least one wall made of a transparent material configured to allow light into the encasing.

4. The system of claim 2, wherein the cuboid structure includes at least one wall made of a heat generating material configured to reflect light within the encasing and generate heat.

5. The system of claim 1, wherein the one or more support components include cone-shaped supports configured to elevate the encasing and/or cause the encasing to move.

6. The system of claim 5, wherein the cone-shaped supports elevate the encasing at a 45° angle to maximize light input to the encasing.

7. The system of claim 1, wherein the encasing includes a spherical structure.

8. The system of claim 1, wherein the encasing includes a pyramidal structure.

9. The system of claim 1, further comprising:
at least one boiler; and
at least one fuel source.

10. The system of claim 1, further comprising:
at least one turbine; and
at least one generator.

11. A system configured to generate heated water, the system comprising:
a first storage tank configured to hold water;
a pre-heat system; and
a second storage tank configured to hold the water, wherein the pre-heat system comprises:
one or more pre-heat tanks for heating the water;
an encasing at least partially surrounding the one or more pre-heat tanks; and
one or more support components configured to support the encasing and cause the encasing to move, wherein
one or more input pipes connect the first storage tank to the pre-heat system,
one or more output pipes connect the pre-heat system to the second storage tank,
the first storage tank provides the water to the pre-heat system using the one or more input pipes, and
the pre-heat system is configured to heat the water and provide the heated water to the second storage tank using the one or more output pipes.

12. The system of claim 11, wherein the encasing includes a cuboid structure.

13. The system of claim 12, wherein the cuboid structure includes at least one wall made of a transparent material configured to allow light into the encasing.

14. The system of claim 12, wherein the cuboid structure includes at least one wall made of a heat generating material configured to reflect light within the encasing and generate heat.

15. The system of claim 11, wherein the one or more support components include cone-shaped supports configured to elevate the encasing and/or cause the encasing to move.

16. A pre-heat system configured to heat water, the pre-heat system comprising:
one or more pre-heat tanks for heating the water;
an encasing at least partially surrounding the one or more pre-heat tanks; and
one or more support components configured to support the encasing and cause the encasing to move, wherein
one or more input pipes connect a first storage tank to the pre-heat system,
one or more output pipes connect the pre-heat system to a second storage tank,
the water is provided to the pre-heat system using the one or more input pipes, and
the pre-heat system is configured to heat the water and provide the heated water to the second storage tank using the one or more output pipes.

17. The pre-heat system of claim 16, wherein the encasing includes a cuboid structure.

18. The pre-heat system of claim 17, wherein the cuboid structure includes at least one wall made of a transparent material configured to allow light into the encasing.

19. The pre-heat system of claim 17, wherein the cuboid structure includes at least one wall made of a heat generating material configured to reflect light within the encasing and generate heat.

20. The pre-heat system of claim 16, wherein the one or more support components include cone-shaped supports configured to elevate the encasing and/or cause the encasing to move.

* * * * *